(12) United States Patent
Prouzet

(10) Patent No.: US 9,157,496 B2
(45) Date of Patent: Oct. 13, 2015

(54) ROTARY-SHAFT BRAKE SYSTEM, IN PARTICULAR FOR AN AIRCRAFT ROTOR OR PROPELLER, INCLUDING A LINEAR ACTUATOR

(71) Applicant: RATIER FIGEAC, Figeac (FR)

(72) Inventor: Bertrand Prouzet, Figeac (FR)

(73) Assignee: RATIER FIGEAC, Figeac Cedex (FR)

( * ) Notice: Subject to any disclaimer, the term of this patent is extended or adjusted under 35 U.S.C. 154(b) by 133 days.

(21) Appl. No.: 13/682,447

(22) Filed: Nov. 20, 2012

(65) Prior Publication Data

US 2014/0231188 A1     Aug. 21, 2014

(30) Foreign Application Priority Data

Nov. 21, 2011  (FR) ...................................... 11 60567

(51) Int. Cl.
| F16D 55/22 | (2006.01) |
|---|---|
| F16D 55/224 | (2006.01) |
| F16D 66/00 | (2006.01) |
| F16D 121/24 | (2012.01) |
| F16D 125/40 | (2012.01) |
| F16D 127/06 | (2012.01) |
| F16D 129/08 | (2012.01) |

(52) U.S. Cl.
CPC ............ *F16D 55/22* (2013.01); *F16D 55/2245* (2013.01); *F16D 2066/005* (2013.01); *F16D 2121/24* (2013.01); *F16D 2125/40* (2013.01); *F16D 2127/06* (2013.01); *F16D 2129/08* (2013.01)

(58) Field of Classification Search
CPC . F16D 65/18; F16D 2121/14; F16D 2121/24; F16D 2125/32; F16D 2125/40; F16D 2125/50; F16D 55/26; F16D 55/31; F16D 55/2245; F16D 55/2255

USPC ........ 188/72.1, 72.9, 173, 1.11 E, 1.11 L, 28, 188/56; 303/11, 89

See application file for complete search history.

(56) References Cited

U.S. PATENT DOCUMENTS

| 2,890,767 | A | * | 6/1959 | Tack ................................ 188/59 |
|---|---|---|---|---|
| 3,690,417 | A | * | 9/1972 | Airheart ....................... 188/71.8 |
| 4,174,025 | A | * | 11/1979 | Ivachev ........................ 188/72.6 |
| 4,697,671 | A | * | 10/1987 | Stewart et al. ............... 188/72.9 |
| 6,722,477 | B1 | * | 4/2004 | Wolfsteiner et al. ......... 188/72.9 |
| 7,413,061 | B2 | | 8/2008 | Wagner et al. |

FOREIGN PATENT DOCUMENTS

| DE | 35 42 937 A1 | 6/1987 |
|---|---|---|
| WO | WO 02/49897 A1 | 6/2002 |

OTHER PUBLICATIONS

French Preliminary Search Report dated Jul. 30, 2012.

* cited by examiner

*Primary Examiner* — Anna Momper
*Assistant Examiner* — San Aung
(74) *Attorney, Agent, or Firm* — Birch, Stewart, Kolasch & Birch, LLP

(57) ABSTRACT

Rotary-shaft brake system includes a rotary braking member attached to a rotary shaft, first and second friction members arranged on either side of the rotary braking member, each friction member being moveable between a first braking position when the friction members are in contact with the rotary braking member and a second idle position away from the rotary braking member, a bracket holding the friction members and guiding device and control device controlling movement of the friction members on the bracket. The control device comprises a linear actuator acting on at least a first lever and a solid elastically deformable element.

13 Claims, 6 Drawing Sheets

ROTARY-SHAFT BRAKE SYSTEM, IN PARTICULAR FOR AN AIRCRAFT ROTOR OR PROPELLER, INCLUDING A LINEAR ACTUATOR

FIELD OF THE INVENTION

The present invention relates to a rotary-shaft brake system, in particular for an aircraft rotor or propeller, for example a disc brake or drum brake.

BRIEF SUMMARY OF THE INVENTION

The present invention relates to a rotary-shaft brake system including:
- at least one rotary braking member attached to said rotary shaft and turning therewith,
- at least one first friction member and one second friction member arranged on either side of said at least one rotary braking member, each friction member being moveable between two extreme positions, a first "braking" position when the first friction member and the second friction member are in contact with the rotary braking member and a second "idle" position when they are moved away from the rotary braking member,
- a bracket for holding said at least first friction member and second friction member on either side of the rotary braking member,
- means for guiding the movement of said at least first friction member and second friction member on the bracket,
- means for controlling the movement of said at least first friction member and second friction member between the extreme braking and idle positions thereof, including an actuator linked to a transmission system for controlling said at least first friction member and second friction member.

There are numerous rotary-shaft brake systems, for example disc-brake or drum-brake systems. For example, a disc brake controlled by actuators acting hydraulically on friction members in the form of brake pads to ensure adequate and efficient braking is known. Conventionally, brake pad means the friction lining and the supporting element joined to it, usually by sintering.

The present invention proposes an alternative rotary-shaft brake system that obviates the need to use hydraulic energy, which is particularly susceptible to leakage.

More specifically, the present invention relates to a brake system as defined above that is designed specifically for the aeronautical industry. Specific problems arise in this field of application.

A first problem in the field of aeronautics is the problem of vibrations. Ambient vibrations are present and good braking, and therefore good holding of the friction members (for example brake pads) on the rotary braking member (or disc (for example brake disc)), should be ensured. Preferably, the generation of spurious noise in the idle position, caused for example by a member frequently hitting an end stop, should also be prevented.

Another problem is related to safety. If the braking device is intended to brake an engine element such as a helicopter rotor or a propeller, braking must be timely. Any risk of accidental braking must therefore be obviated.

The present invention firstly proposes that the actuator used to control movement be a linear actuator acting on at least a first lever incorporated in series into a transmission system for controlling said at least first and second friction members.

By gearing down the force, the linear actuator combined with the lever provides sufficient braking efficiency to act on the aircraft propellers or rotors. Advantageously, the actuator may be electrical or electromechanical and powered by electricity, for example a rotary electric motor driving a nut-and-screw transmission system, or similar. The brake system may be a disc- or drum-brake system, in the latter case the drum being for example cylindrical and the friction members being brake shoes rubbing against the inside or outside cylindrical surface of the cylinder.

Advantageously, the means for controlling the movement of the first friction member and of the second friction member between the extreme braking and idle positions thereof include, incorporated in series into said control transmission system, an elastically deformable solid element that is able to accumulate potential mechanical energy in the control transmission system, the actuator being able to move, firstly, beyond the control position thereof in which the first friction member and the second friction member reach the braking position thereof and, secondly, beyond the control position thereof in which the first friction member and the second friction member reach the idle position thereof, by elastic deformation of said deformable solid element under the effect of the linear actuator.

The elastically deformable solid element advantageously enables a pre-stress to be applied to the control transmission system, which can be used in braking position as a parking brake for example, and in idle position as a stress to compensate for running clearances. Furthermore, the elastically deformable solid element built into the transmission system provides the system with mechanical flexibility that facilitates adjustment of the braking force applied by the actuator. Thus, in the case of an electrical or electromechanical linear actuator, this feature for example makes it possible to maintain a braking torque in the absence of electrical power in spite of the effects of differential thermal expansion, or, if the system advantageously has mechanical stops in idle position, to provide a preload in this position to reduce the harmful impact of vibrations during the flight phases, thereby increasing the life cycle of the system.

Advantageously, said elastically deformable solid element, which can accumulate potential mechanical energy in said control transmission system, comprises a bendingly deformable part of said lever under the effect of said linear actuator, the deformation occurring once the first friction member and the second friction member have reached either the braking position thereof or the idle position thereof.

This solution makes the system simple and efficient, particularly in terms of controlling the energy accumulated by bending deformation of the lever. A lever advantageously allows bending to be applied simply in two opposing directions, which can be matched with the movements intended to lead to the two braking and idle positions. The actuator preloads the bendingly deformable part by being powered beyond the extreme idle and braking positions, by a value set in consideration of requirements, before power to the actuator is cut. At this moment, the actuator advantageously maintains the position thereof using any known means, for example as detailed below. Once the power has been cut, the power accumulator, i.e. the bendingly deformable part adopting in this case the form of a tensioned spring blade, holds the preload. The use of an elastically flexible lever obviates the need to use additional springs, at least a first spring to ensure a stressing of the friction members on the rotary braking member and at least one second spring to control the running clearances and to ensure there is no vibration in the friction members and/or an element of the transmission system in contact with at least one stop.

Advantageously, the system according to the invention also includes means for measuring the force applied by the linear actuator to the first friction member and to the second friction member, comprising means for measuring the bow of said bendingly deformable part of said first lever, or means for measuring the stresses applied to this latter.

It is for example possible to control the force applied by measuring the bow of the deformable part of the lever using a position sensor such as a switch, using the Hall effect, or a linear variable differential transformer (LVDT) for example. It is also possible to place strain gauges in the deformable part of the lever acting as spring blades, in order to control the force applied to the friction members.

Advantageously, said means for guiding the movement of said at least first and second friction members on the bracket include at least a first deformable parallelogram and a second deformable parallelogram, respectively.

This feature ensures a uniform wearing of the friction members by a movement of the friction surface thereof parallel or substantially parallel to the friction surface of the rotary braking member, for example a disc or drum.

Advantageously, said first bendingly deformable lever is connected in said control transmission system between a first extremity of the linear actuator and one of the sides of one of said first or second deformable parallelograms, and said one of the sides of one of said first or second deformable parallelograms is controlled by the linear actuator.

This feature offers a simple and optimized solution for a control system combined with a linear actuator and an energy accumulator.

Advantageously, said first bendingly deformable lever is integral with said one of the sides of one of said first or second deformable parallelograms, and is arranged as a longitudinal extension thereof.

Advantageously, a second extremity of said linear actuator, opposite the first extremity, is connected to one of the sides of the other of said first or second deformable parallelograms.

First extremity and second extremity of the linear actuator means the two parts of the linear actuator that can be moved in relation to each other to apply a linear movement moving two points determined respectively on the two parts towards or away from each other. This feature makes the brake system according to the invention simple to design and manufacture: the two parts of the actuator are respectively linked to the two guiding parallelograms of the two pads, advantageously by means of two levers. Thus, this feature enables any centring faults of the rotary braking member in relation to the friction members to be compensated.

According to an advantageous feature, said second extremity of said linear actuator is cantilevered to said one of the sides of the other of said deformable parallelograms.

According to an advantageous feature, said linear actuator includes built-in means for locking itself in any position of movement of said friction members.

The linear actuator, preferably running on electricity, may be reversibly or non-reversibly moveable when it is not powered. If it is reversible, it is advantageous that it be provided with an additional locking device to enable the position of the friction members to be simply guaranteed when power is cut to the actuator, which is electrical in the case of an actuator running on electricity. If it is non-reversible on account of the nature of the movement transmission thereof, for example if it has an ACME screw, a worm drive, etc., this feature provides the actuator with intrinsic controlled immobilization when power is cut to the actuator; nonetheless, such an actuator can also be fitted with a supplementary locking system, for example a spring-applied brake or similar.

According to an advantageous feature, said built-in locking means are provided by the non-reversible nature of said linear actuator, on account of the nature of the movement transmission thereof, and according to another advantageous feature, said linear actuator is a reversible actuator, on account of the nature of the movement transmission thereof, and said built-in means for locking the linear actuator are provided by an additional locking device, for example a spring-applied brake or similar.

According to an advantageous feature, the brake system according to the invention also includes emergency anti-skid means including:
  means for elastically returning the first friction member and the second friction member to the idle position thereof when they are moved away from the rotary braking member,
  means for disengaging said additional locking device,
  said elastic return means being coupled to said disengagement means such that they are active when the actuator is deactivated and said disengagement means are activated.

The anti-skid system enables the friction members to be automatically returned to the idle position in emergencies: if the additional locking device is for example a spring-applied brake, if the brakes are locked, disengagement of the spring-applied brake combined with the reversibility of the linear actuator and the elastic return means automatically return the friction members to the idle position.

According to an advantageous feature, the brake system according to the invention also includes safety means for locking said at least first and second friction members in the idle position thereof when they are moved away from the rotary braking member, by means of an obstacle-connection member in addition to the means for controlling the movement of the first friction member and of the second friction member between the extreme braking and idle positions thereof.

This feature provides an additional safety device independent of the actuator, to prevent any untimely braking. This safety device is intended to mechanically limit the movement of the friction members in the idle position thereof, by locking them in this position independently of the actuator, for example by acting advantageously in an appropriate zone of the transmission system for controlling the friction members.

According to an advantageous feature, the obstacle-connection member includes a slide system to immobilize the parallelograms, and means for locking the slide system activated by elastic return means to lock said slide system, and that is released by an express command.

This feature enables passive locking and unlocking triggered by a specific action, which improves control of the braking command and helps to prevent untimely braking: indeed, in addition to powering the actuator, it is also necessary to unlock the friction members or a specific member of the transmission system for controlling the friction members in advance to effect braking.

According to an advantageous feature, said actuator is an electrical linear actuator.

An electrical actuator means an actuator running on electricity.

According to an advantageous feature, the brake system according to the invention includes means for monitoring the wear of the first friction member and of the second friction member by measuring the distance between a first extremity and a second extremity of the actuator.

According to an advantageous feature, the linear actuator is a revolving-nut actuator, and the means for monitoring the wear of the friction members include means for counting the number of revolutions of said revolving nut or of the motor.

BRIEF DESCRIPTION OF THE SEVERAL VIEWS OF THE DRAWINGS

Other features and advantages are set out in the description of a non-limiting example embodiment of a brake system according to the invention, accompanied by the attached drawings.

DETAILED DESCRIPTION

Figure 1:
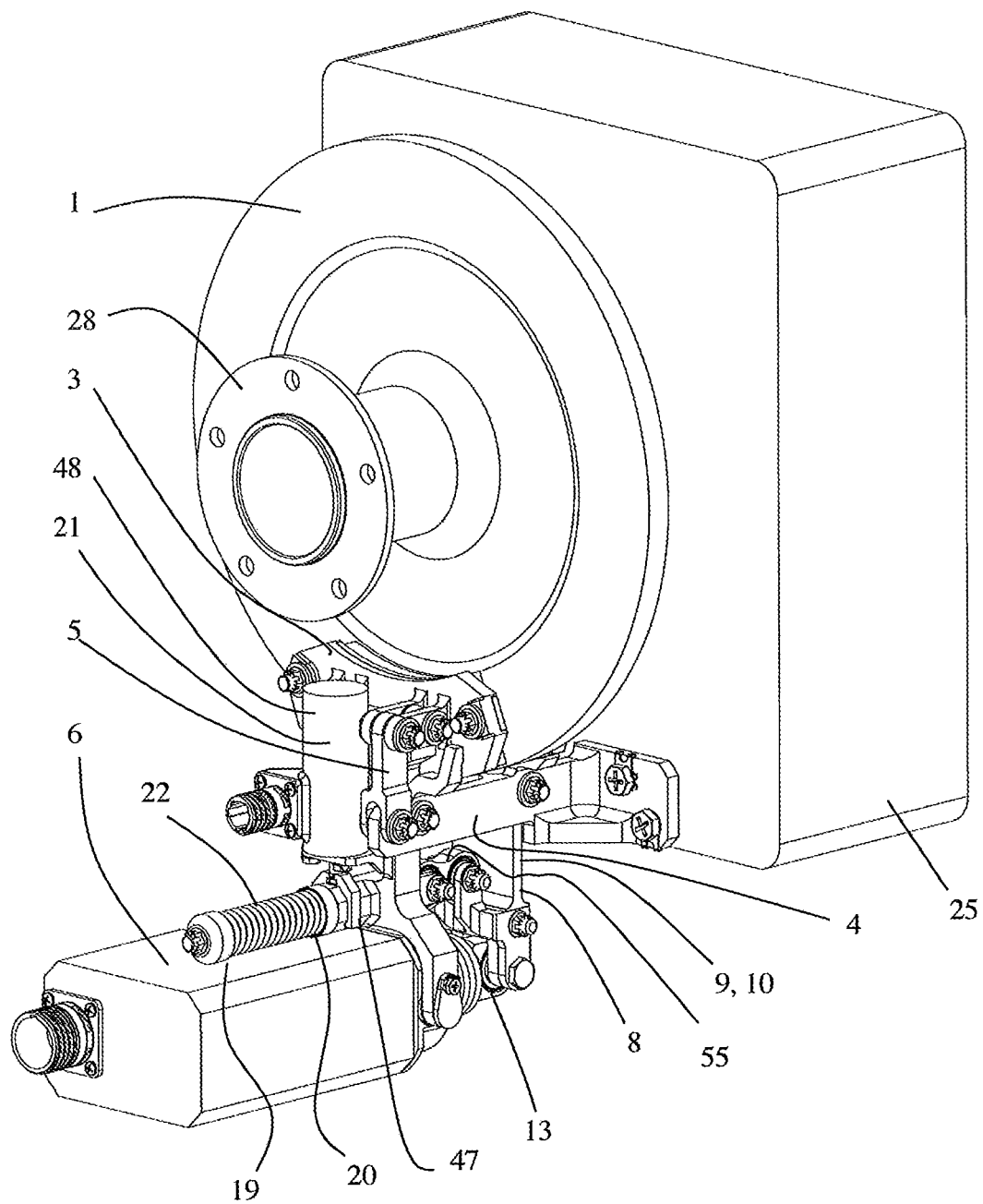
FIG. 1 is a complete front perspective view of an example embodiment of a brake system according to the invention for an aircraft propeller or rotor.
Figure 2:
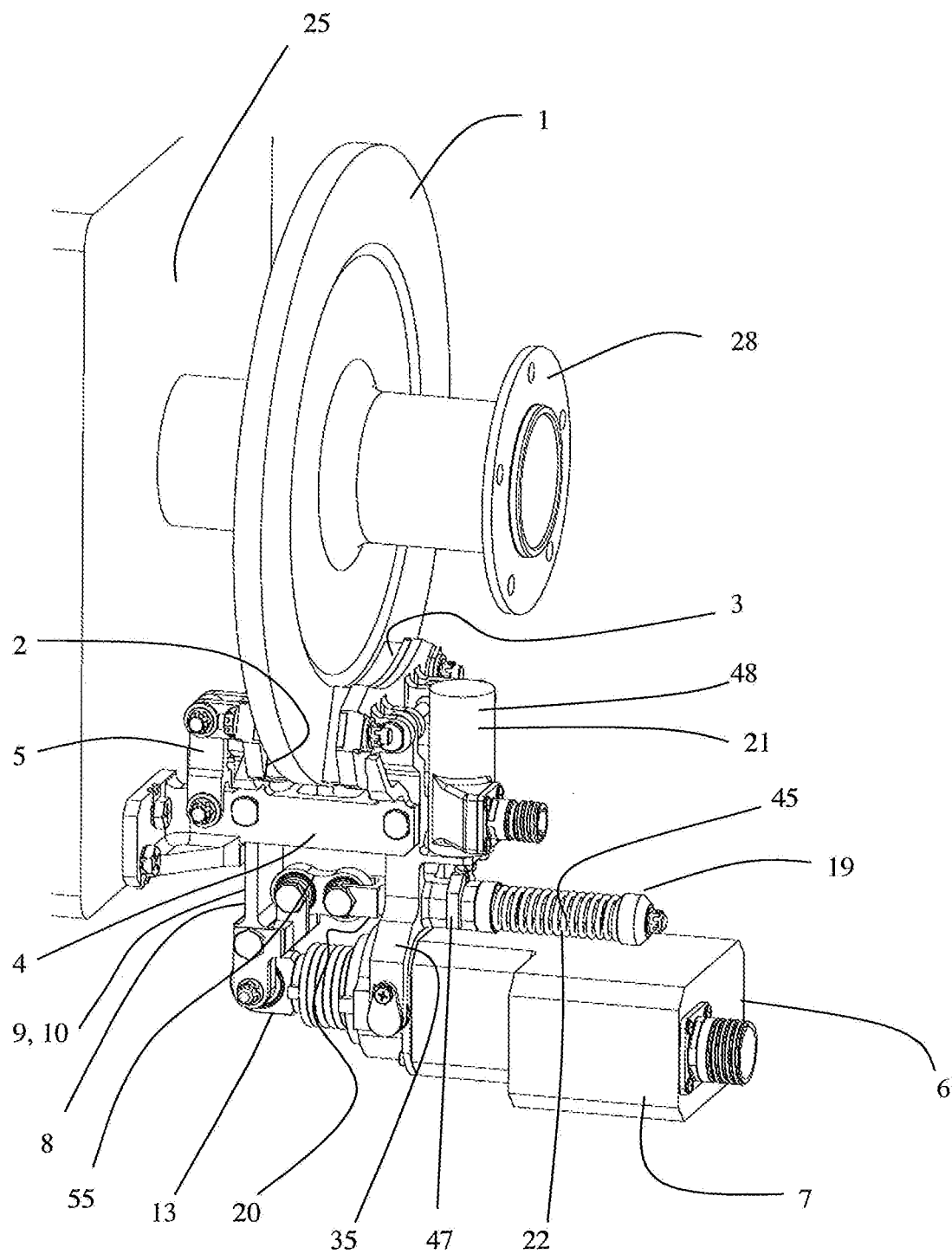
FIG. 2 is a magnified partial perspective rear view of the example in FIG. 1.

It should be noted that the front/rear orientation of FIGS. 1 and 2 is not related to the front/rear orientation of an aircraft to which the brake system shown in the figures is designed to be fitted. Moreover, this aircraft is not shown. Only a frame 25 to which the brake system is attached is shown partially. The disc-brake system shown is particularly but not exclusively suited to braking a helicopter rotor (not shown) or an aircraft propeller rotor (not shown).

Figure 3:
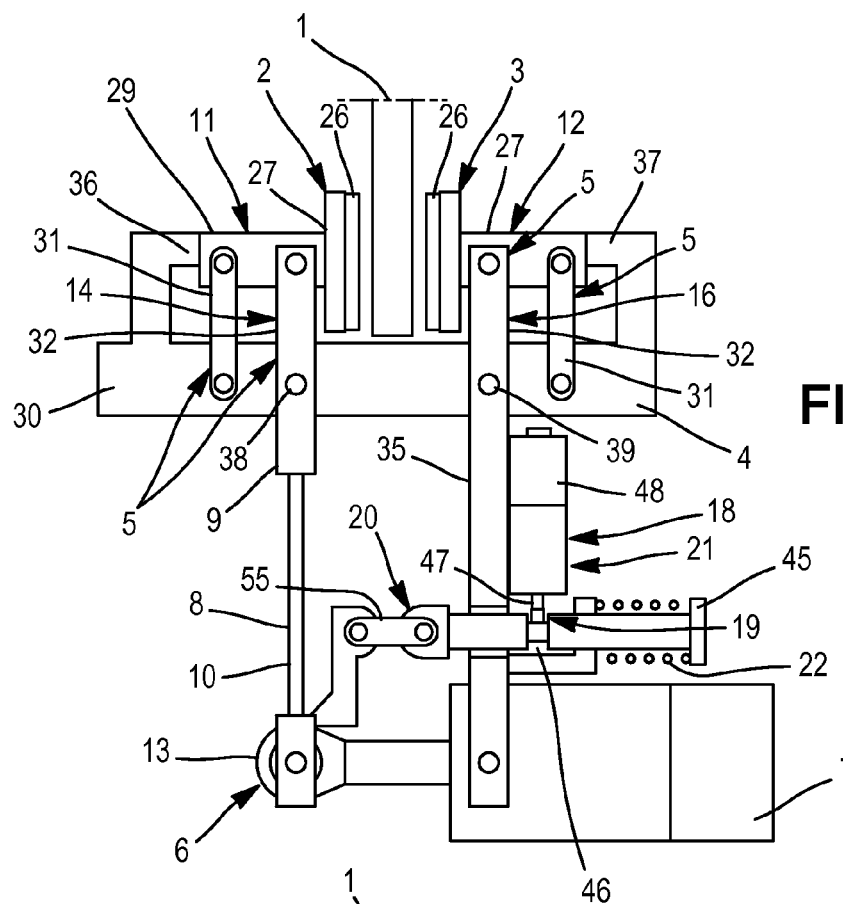
FIG. 3 is a schematic axial cross section of the example of the brake system in FIG. 1, in idle position.
Figure 4:
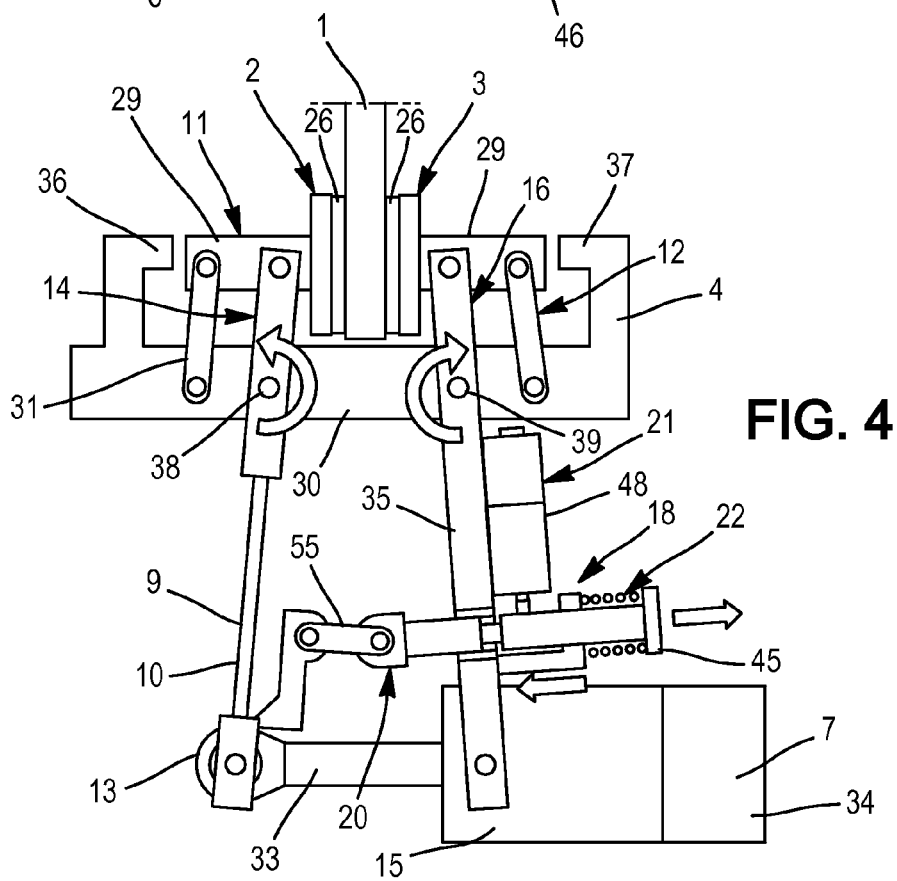
FIG. 4 is a schematic axial cross section of the example of the brake system in FIG. 1, in braking position.
Figure 5:
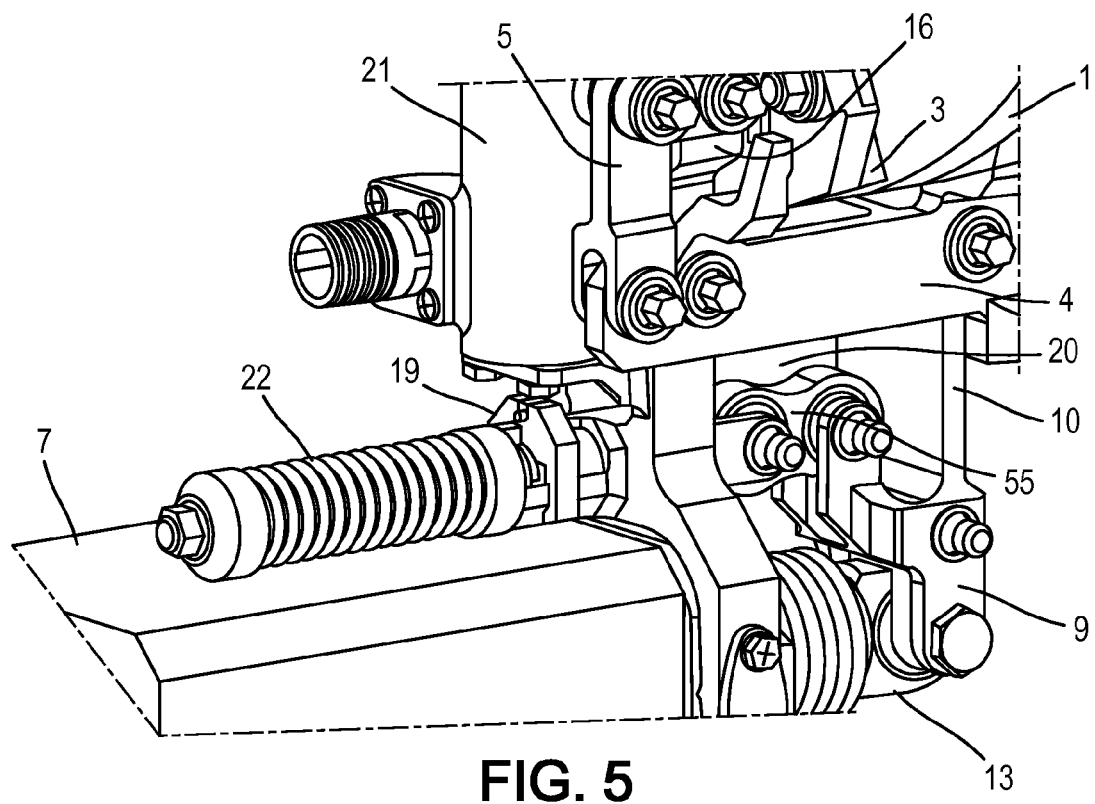
FIG. 5 is a detailed front perspective view of the example brake according to FIG. 1, taken level with the safety means for locking the friction members in the idle position thereof.

It should be noted that the brake system shown has a disc engaging with the brake pads, but it could be used with a drum instead of the disc, the axis of rotation of the drum being pivoted 90° in relation to the axis of rotation of the disc in the plane of the sheet shown in FIGS. 3 and 4. The brake pads would be replaced by shoes rubbing against a cylindrical surface of the drum, the shoes having a concave (or convex) friction surface fitting the convex (or concave) shape of the cylindrical surface of the drum.

The rotary-shaft brake system shown includes:
a rotary braking member in the form of a disc 1,
a first friction member and a second friction member in the form of a first brake pad 2 and a second brake pad 3 arranged on either side of the disc 1, each being movable between two extreme positions, a first "braking" position when the first brake pad 2 and the second brake pad 3 are in contact with the disc 1 as shown in FIG. 4, and a second "idle" position in which they are moved away from the disc 1 as shown in FIG. 3,
a bracket 4 for holding the first brake pad 2 and the second brake pad 3 on either side of the disc 1,
means 5 for guiding the movement of the first brake pad 2 and the second brake pad 3 on the bracket 4,
means 6 for controlling the movement of the first brake pad 2 and the second brake pad 3 between the extreme braking and idle positions thereof, including a linear actuator 7 linked to a transmission system 8 for controlling the first brake pad 2 and the second brake pad 3.

In the non-limiting example embodiment shown, the linear actuator 7 acts on a first lever 9 incorporated in series into the transmission system 8 for controlling the first brake pad 2 and the second brake pad 3, as described in greater detail below.

The disc 1 is for example a disc used conventionally for the purposes indicated, as required. Such discs are known to the person skilled in the art and as such they are not described in greater detail here.

The first brake pad 2 and the second brake pad 3 each include friction linings 26, for example conventional linings as known to the person skilled in the art, adapted as required, which are not described in greater detail here.

The first brake pad 2 and the second brake pad 3 also each include a supporting element 27 for the lining. The supporting elements 27 are advantageously identical and a supporting element 27 includes, in the embodiment shown, a first part comprising, in a known manner, a plate for connecting the friction lining or linings 26, and a second part for connecting the supporting element 27 of the lining to the bracket 4, which is described below.

The bracket 4 for holding the first brake pad 2 and the second brake pad 3 on either side of the disc 1 is made up of a rigid part that is for example U-shaped with a base 30. A sector of the disc 1 is placed inside the U such that the base of the U is perpendicular to the friction surface of the disc, and the brake pads 2 and 3 are arranged on either side of the disc 1 and connected to the brackets 4 by a partial connection, preferably a connection allowing a degree of free translational movement as described below. The bracket 4 is joined to the frame 25 of the aircraft (not shown) using any known means, for example screws, and the disc 1 is attached to a rotor 28 to be braked by the brake system.

The means 5 for guiding the movement of the first brake pad 2 and the second brake pad 3 on the bracket 4 advantageously include at least a first deformable parallelogram 11 and a second deformable parallelogram 12, respectively, as shown in greater detail in FIGS. 3 and 4. For this purpose, a supporting element 27 of the friction lining 26 of a brake pad 2, 3 includes a branch 29 that is perpendicular to the friction surface and that advantageously defines a first of the four sides of a deformable parallelogram. The bracket 4, in the base 30 of the U that is perpendicular to the friction surface, defines a second side, opposite the first side, of the four sides of a deformable parallelogram 11, 12. The third and fourth sides of a deformable parallelogram 11, 12 are defined respectively by a first tie rod 31 and a second tie rod 32 linked by the two extremities thereof with a degree of freedom of rotation, to the branch 29 of the supporting element 27 of the brake pad and to the base 30 of the U formed by the bracket 4, respectively, as shown in greater detail in FIGS. 3 and 4. The four sides of a deformable parallelogram 11, 12, defined thus, are advantageously rigid. It should be noted that in the example shown, the bracket 4, in the base 30 of the U perpendicular to the friction surface, defines the two sides of the two parallelograms 11, 12 opposite the first sides, which are in turn defined by the two supporting elements 27 of the brake pads 2, 3 respectively.

The first lever 9 incorporated in series into the transmission system 8 for controlling the first brake pad 2 and the second brake pad 3, is advantageously and rigidly attached to one of the four sides of the deformable parallelogram 11 in the example, for example the tie rod 32 closest to the disc 1, as shown in FIGS. 3 and 4. The first lever 9 is for example and preferably integral with the tie rod 32.

Thus, the deformable parallelograms 11, 12 cause the friction linings 26 to move in parallel to the opposing friction surfaces of the disc 1 by moving one of the sides of each deformable parallelogram 11, 12.

The first lever 9 is advantageously connected in the control transmission system 8 between a first extremity 13 of the linear actuator 7 and one of the sides 14 of the first deformable parallelogram 11, i.e. the tie rod 32 in the example shown. The tie rod 32 attached to the first lever 9 is therefore controlled by the linear actuator 7.

A second extremity 15 of the linear actuator 7, opposite the first extremity 13, is advantageously connected to a side 16 of the second deformable parallelogram 12 closest to the disc 1, i.e. the tie rod 32 in the example shown, by means of a second lever 35. The tie rod 32 of the second parallelogram 12 is advantageously attached to the second lever 35, in the manner of the tie rod 32 of the first parallelogram 11 with the first lever 9. The tie rod 32 of the second parallelogram 12 is therefore also advantageously controlled by the linear actuator 7 controlling the first lever 9.

The first extremity 13 of the actuator is for example the extremity of a movable rod 33 in the case of a moving-rod linear actuator, for example a screw linear actuator. The second extremity 15 of the actuator is a body 34 of the actuator in which the moveable rod 33 moves, for example by means of a revolving nut rigidly connected to a driveshaft of the actuator.

The connections between the first extremity 13 and second extremities of the linear actuator 7, and the levers 9, 35, respectively, are articulated advantageously to enable them to rotate in relation to each other.

As shown in greater detail in FIGS. 3 and 4, the linear actuator 7 linked thus to the two parallelograms 11, 12 works as follows:
when the extremity 13 of the linear actuator 7 is moved away from the body 34 thereof by powering the actuator, the deformable parallelograms 11, 12 are simultaneously deformed in mutually opposing directions such that the brake pads 2, 3 move towards the disc 1, switching from the idle position (FIG. 3) to the braking position (FIG. 4), and
conversely, for example by inverting the power supply of the actuator, when the extremity 13 of the linear actuator 7 is moved towards the body 34 thereof, the deformable parallelograms 11, 12 are deformed in the opposite direction respectively, such that the brake pads 2, 3 move away from the disc 1, switching from the braking position (FIG. 4) to the idle position (FIG. 3).

The two movements of the two brake pads 2, 3 are effected by inverse rotations of the two levers 9 and 35 about two axes of rotation 38, 39 passing through the base of the U formed by the bracket 4, respectively, as shown in FIGS. 3 and 4. Each axis of rotation 38, 39 of each lever 9, 35 in the example is one of the four points of articulation of each deformable parallelogram 11, 12 respectively. In the example shown, the deformable parallelograms 11, 12 are arranged in the U formed by the bracket 4.

The linear actuator 7 is only connected to the two levers 9, 35 such that the pressure exerted by the linear actuator 7 on the brake pads 2, 3 is automatically balanced on either side of the disc 1.

Advantageously, the bracket 4 may have two end stops 36, 37 for the brake pads 2, 3 in idle position, respectively, as shown in greater detail in FIG. 3. These stops 36 and 37 may for example be formed at the extremity of the branches of the U defined by the bracket 4. Each brake pad 2, 3 moves advantageously in a space between the friction surface of the disc 1 and the corresponding stop 36, 37 of the bracket 4.

The means 6 for controlling the movement of the first brake pad 2 and the second brake pad 3 between the extreme braking and idle positions thereof advantageously include, incorporated in series into the control transmission system 8, an elastically deformable solid element 10 that can accumulate potential mechanical energy in the control transmission system 8, by movement of the moveable rod 33 beyond the positions thereof corresponding to arrival at the braking position and the idle position of the first brake pad 2 and the second brake pad 3, by elastic deformation of the deformable solid element 10 under the effect of the linear actuator 7.

Figure 9:
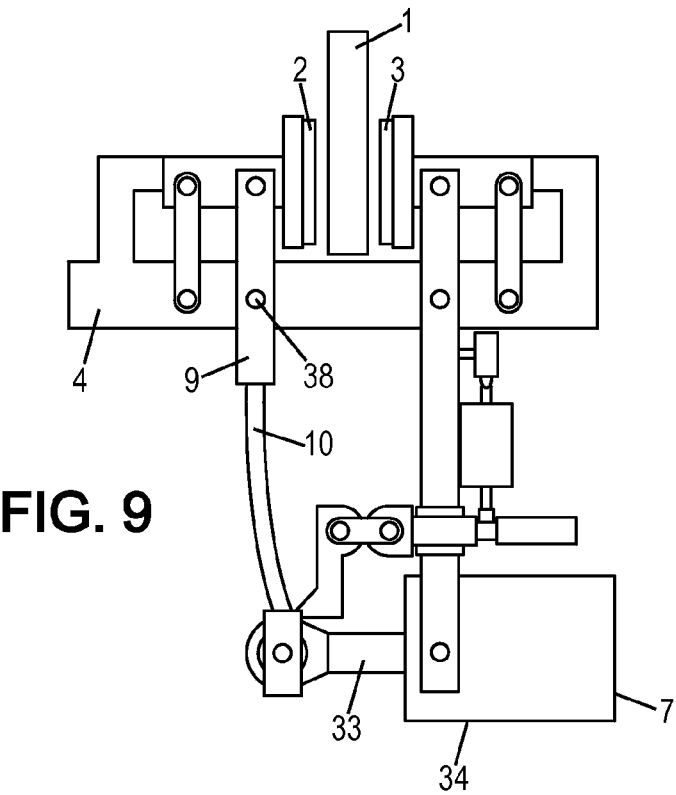
FIG. 9 is a view similar to the one in FIG. 6, without the detailed view, showing the deformation of a lever.
Figure 10:
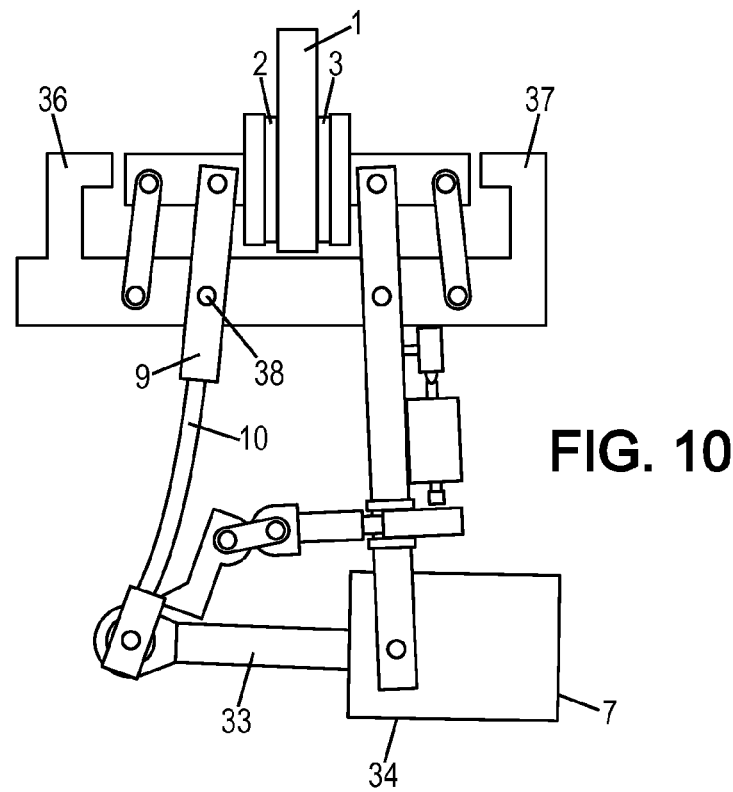
FIG. 10 is a view similar to FIG. 9 in which the friction members are in the braking position thereof.

Preferably, as shown in greater detail in FIGS. 9 and 10, the elastically deformable solid element 10, which is able to accumulate potential mechanical energy in the control transmission system 8, is made up of a bendingly deformable part of the first lever 9 that is deformed under the effect of the linear actuator 7 when the moveable rod 33 continues to move after the first brake pad 2 and the second brake pad 3 have reached the idle position or the braking position thereof.

The first bendingly deformable lever 9 is therefore, in the example, connected in series in the control transmission system 8 between the first extremity 13 of the linear actuator 7 and the side 14 of the first deformable parallelogram 11, formed by the tie rod 32, controlled by the linear actuator 7. The first bendingly deformable lever 9 is preferably integral with the side 14 of the first deformable parallelogram 11, and is arranged as a longitudinal extension thereof.

The second extremity 15 of the linear actuator 7 is cantilevered to the side 16 of the second deformable parallelogram 12 formed by the tie rod 32.

The bendingly deformable part may be obtained by a local thinning of the section of the lever 9 over a given length, in order to reduce the moment of inertia of this section to the bending in the desired direction, preferably such as to define a controllable and measurable deformation, on the basis of which the elastic stress applied to this deformable part can be determined.

The solid element 10 incorporated into the first lever 9 and therefore also into the transmission system 8 for controlling the brake pads 2, 3 is for example a metallic elastic blade. This elastic blade may be incorporated into the first lever 9 as shown in the attached figures. This blade is then advantageously made of the same material (metal) as the first lever 9. The dimensions of the blade are determined as a function of several parameters. These depend in particular on the material used to make the first lever 9 and therefore the blade, the force that may be exerted by the linear actuator 7 and/or the force exerted at the brake pads 2, 3, and the environment (vibrations and external forces liable to act on the braking mechanism).

Figure 6:
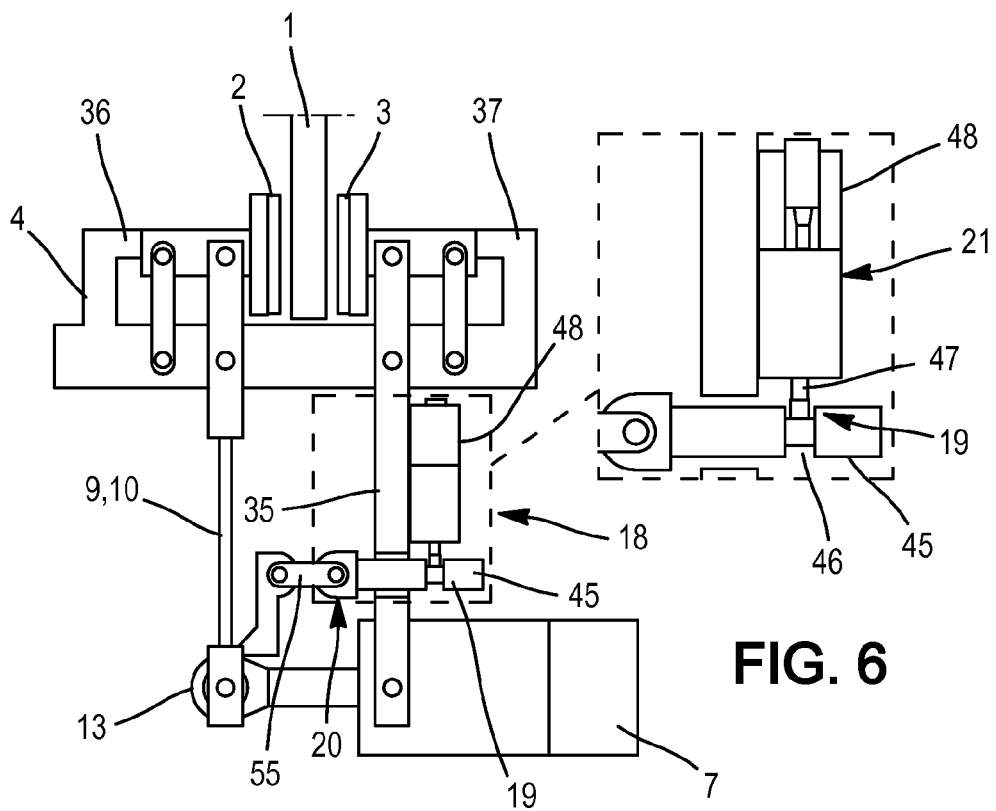
FIG. 6 is a schematic axial cross section of an alternative to the example in FIG. 3, showing the safety means for locking the friction members in the idle position thereof.

By way of a non-limiting numerical example, an elastic blade 50-100 mm long could be used. It can be made by adding to the first lever 9 or by inserting a separate elastic part between, firstly, the moveable rod 33 and more specifically a point of articulation at the extremity thereof and, secondly, the axis of rotation 38 of the first lever 9 on the bracket 4. The elastic blade is dimensioned such that the flexed blade has a bow of between several tenths of a millimeter (mm) and several millimeters. Thus, when the brake pads 2, 3 reach the idle position thereof, as shown in FIG. 6, the moveable rod 33 moves further into the body 34 of the linear actuator 7 by several tenths of a millimeter to several millimeters. The same applies to the braking position, as shown in FIG. 10. This figure shows the person skilled in the art that the moveable rod 33 has continued to move outside the body 34 of the linear actuator 7 after the brake pads 2, 3 have come into contact with the disc 1 (see FIG. 4 for another alternative embodiment to the embodiment shown in FIG. 10).

The presence of the elastic blade (or similar means assembled in series in the transmission system 8) is very advantageous in relation to the use of conventional elastic means such as springs, which only enable pre-stressing in one direction. In the present application, at least two springs would have to be provided to keep the brake pads either in the idle position thereof or in the braking position thereof. The solution proposed here is more simple and easier to implement. No additional parts are required, in particular if the elastic blade is built into the first lever.

The brake system shown may advantageously include means for measuring the force applied by the linear actuator 7 to the first brake pad 2 and to the second brake pad 3, including means for measuring the bow of the bendingly deformable part of the first lever 9, or means for measuring the stresses applied to this latter, for example using strain gauges, or any other means for measuring the deformation of this deformable part, for example a position sensor such as a switch, using the Hall effect, or a linear variable differential transformer (LVDT).

The linear actuator 7 freely moves the brake pads 2, 3 between the two extreme positions thereof. Beyond these positions, and in the presence of a lever having an elastically deformable part, sustained powering of the linear actuator 7 causes the extremities 13, 15 of the linear actuator 7 to move towards or away from one another, while the pads are immobilized either against the stops 36, 37 in idle position, or against the friction surfaces of the disc 1 in braking position. Thus, the bendingly deformable part of the levers, having less moment of inertia and being incorporated in the transmission system for controlling the pads, is elastically and bendingly deformed to accumulate the mechanical energy. The power to the actuator is cut when the energy accumulated satisfies the related requirements, which may be measured using the deformation of the deformable part of the lever 9. When the power to the actuator is cut, the actuator holds the position it adopts when the power is cut in order to hold the energy accumulated during deformation of the lever and therefore the braking force, for example as described below.

For this purpose, the linear actuator 7 advantageously includes built-in means for locking itself in any position of movement of the first brake pad 2 and of the second brake pad 3.

These built-in locking means are for example the non-reversible nature of the linear actuator 7 on account of the nature of the movement transmission thereof. If the actuator is reversible on account of the nature of the movement transmission thereof, said built-in locking means of the linear actuator may be an additional locking device. The linear actuator 7 may be non-reversible, and still include an additional locking device. In the example shown, the linear actuator is advantageously a revolving-nut reversible electrical linear actuator 7, also including a spring-applied brake 17 as shown in FIGS. 7 and 8 described in detail below.

Figure 7:
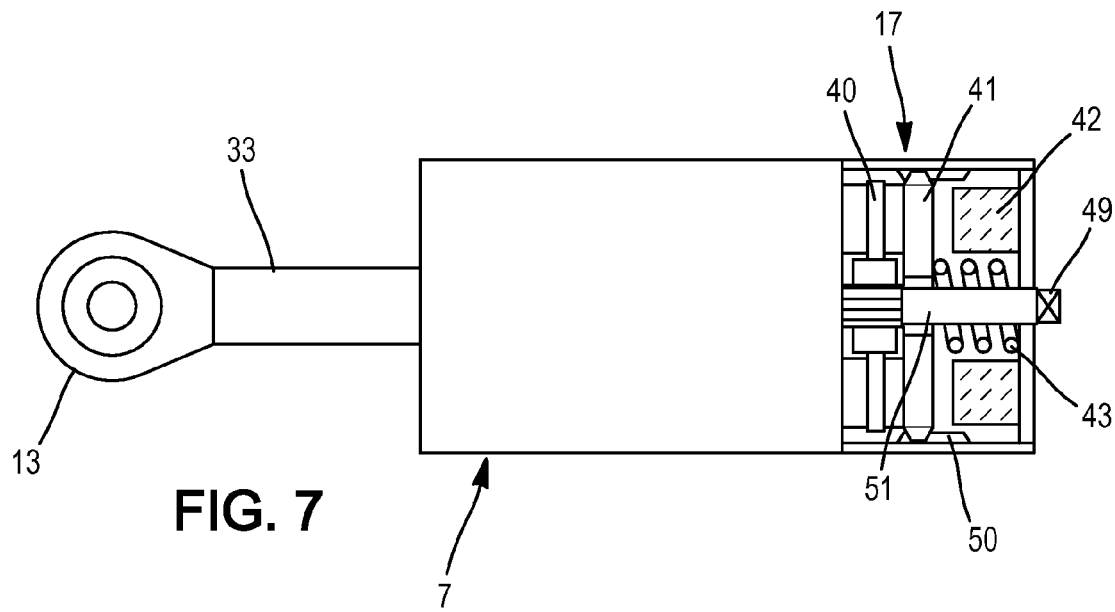
FIG. 7 is a schematic, partial, axial cross section of an example embodiment of an actuator according to FIGS. 3, 4 and 6, the cross section being taken level with the built-in locking means, in locked position.

In FIG. 7, the electrical linear actuator 7 is not powered and the spring-applied brake 17 is in locking position under the effect of a return spring 43 exerting an axial thrust on an axially sliding plate 41 joined in rotation with the body 34 of the linear actuator 7 by axial grooves 50, against an axial stop 44 rigidly connected to the body 34 of the linear actuator 7, by means of a non-magnetic floating friction disc 40 joined in rotation to the revolving nut of the linear actuator 7. An axial electromagnet 42 that is unpowered as long as the actuator remains unpowered, thereby permitting the action of the spring 43, is arranged about the spring 43 in the example. The floating friction disc 40 is free to move in translation on a drive shaft 51 of the linear actuator 7, in the example a shaft rigidly connected to the revolving nut (not shown) and attached in rotation in relation to the drive shaft 51; this connection may for example be effected using grooves as in the connection between the sliding plate 41 and the body 34 of the actuator. The sliding plate 41 is made of a material sensitive to magnetism, for example steel.

Figure 8:
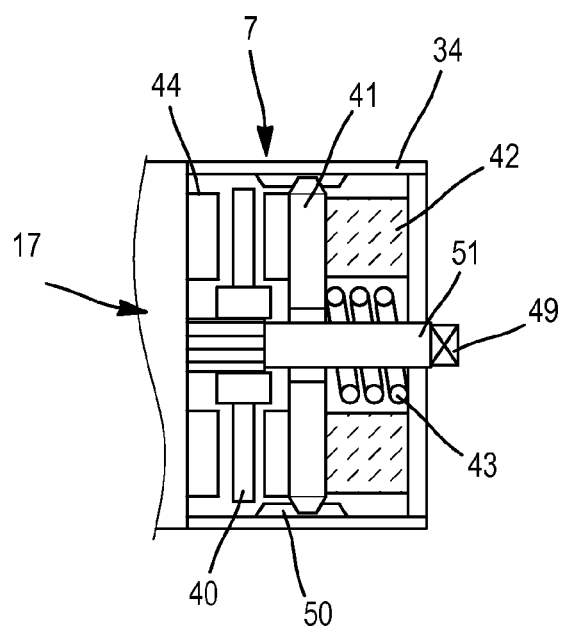
FIG. 8 shows the cut-out part of FIG. 7, the built-in locking means being shown in unlocked position.

In FIG. 8, the linear actuator 7 and the electromagnet 42 are powered, which causes the deactivation or disengagement of the spring-applied brake 17, thereby enabling the movement of the moveable rod 33 in relation to the body 34 of the linear actuator 7. Indeed, the electrically powered electromagnet 42 axially attracts the sliding plate 41, compressing the spring 43, which releases the floating friction disc 40 and therefore releases the rotational lock caused by the absence of power between the revolving nut and the body 34 of the linear actuator 7 by means of the spring-applied brake 17. The moveable rod 33 can then be moved in relation to the body 34 of the linear actuator 7 by powering this latter and rotating the revolving nut.

The brake system shown also advantageously includes emergency anti-skid means including:

means 22 for elastically returning the first friction members and the second friction members (i.e. the first brake pad 2 and the second brake pad 3) to the second idle position thereof when they are moved away from the rotary braking member (i.e. disc 1 in the example embodiment), means for disengaging the additional locking device, the elastic return means 22 being coupled to the disengagement means such that they are active when the linear actuator 7 is deactivated and the disengagement means are activated.

The elastic return means 22 are described in greater detail below. The means for disengaging or deactivating the additional locking device are described above in relation to the use of a spring-applied brake 17.

The brake system shown also advantageously includes safety means 18 for locking the first brake pad 2 and the second brake pad 3 in non-braking position, preferably in the second idle position thereof when they are moved away from the disc 1, by means of an obstacle-connection member 19 supplementing the means 6 for controlling the movement of the first and second brake pads 2, 3 between the extreme braking and idle positions thereof.

For example, as shown in greater detail in FIGS. 3, 4 and 6, the obstacle-connection member 19 advantageously includes a slide system 20 for immobilizing the parallelograms 11 and 12, and means 21 for locking the slide system 20 that are activated by elastic return means (not shown) to lock the slide system 20, and released by an express command of the locking means 21.

In the example shown, the slide system 20 specifically immobilizes the two levers 9, 35 moved by the linear actuator 7, to the idle position of the brake pads 2, 3. The slide system 20 includes for example a rigid rod 45, one point of which, for example one extremity, is joined to one of the two levers 9, 35 by means of an actuating tie rod 55, and the other point of which, for example the other extremity, slides freely in the other of the two levers 9, 35. A seat 46, for example a circular groove, is formed on the side of the sliding extremity of the rod 45, in which a movable bolt 47 is engaged, for example by elastic return (not shown), in the immobilized or locked position of the two levers 9, 35, as defined above. The movable bolt 47 is for example the shaft of a solenoid 48 that is advantageously movable between the following two positions in relation to the lever 35:

a passive or idle position when the solenoid 48 is unpowered, the bolt 47 being engaged by elastic return in the seat 46 of the rod 45, as shown in FIGS. 3 and 6, and an active position when the solenoid 48 is powered by an express command, the bolt 47 then being outside the seat 46, and the rod 45 being free to slide in the lever 35, as shown in FIG. 4.

The actuating tie rod 55 is an example of means of enabling the rod 45 to slide in the lever 35, because the rod 45 is connected at one point to this lever 35 by means of a connection having a degree of freedom of sliding translational movement or by a sliding pivot connection, while another point of the rod 45 is connected to the lever 9 by means of the actuating tie rod 55, both levers 9 and 35 being movable in relation to one another by rotation via the bracket 4.

In the example, the body of the solenoid 48 is attached to the lever 35.

The slide system 20 also preferably includes, as shown in FIGS. 3 and 4, for example a compression spring, forming return means 22, arranged such that it exerts a force returning the levers 9, 35 to the safety position corresponding to the idle position of the pads 2, 3. It should be noted that FIG. 6 does not show such a return spring. The return means 22 are advantageously arranged such that they apply the elastic return force thereof tending to return the levers 9, 35 to the idle position of the brake pads 2, 3, causing such a movement of the levers 9, 35 if the linear actuator 7 is reversible and unpowered. The return means 22 are for example placed in the direction of and about the sliding axis of the rod 45, as shown in FIGS. 3 and 4. In the event of motor control failure, this system uses a combination of the elastic return means 22 and a reversible linear actuator fitted with additional locking means in the form of a disengageable spring-applied brake to return the pads to the idle position by simply powering the spring-applied brake or unlocking it manually.

The spring-applied brake may alternatively be released by mechanical means (not shown), for example by means of a cable attached to the sliding plate 41 and subject to outward axial traction. An independent power source for the winding, or a second winding, may also be used to perform this function.

As shown in FIGS. 7 and 8, the linear actuator may include external means 49 for engaging the drive shaft 51 to enable, in the event of a problem, a manual intervention on the revolving nut of the linear actuator 7 in the example, and therefore of the actuator itself.

Advantageously, the disc brake system includes means (not shown) for monitoring the wear of the first and second brake pads by measuring the centre-to-centre distance of the linear actuator 7, or by measuring the distance between the first extremity 13 and the second extremity 15 of the actuator, for example using means for counting the number of revolutions of the revolving nut or the motor of the linear actuator 7. Indeed there is a direct relationship, via the control transmission system 8, between the number of revolutions of the revolving nut or the motor of the linear actuator 7 and the movement of the brake pads 2, 3. In the example, this relationship is given by the pitch of the screw/revolving nut pairing, and by the ratio of the lengths of the lever arms on either side of the axis of articulation of the levers 9, 35 on the bracket 4.

The invention claimed is:

1. Rotary shaft brake system including:
   at least one rotary braking member attached to said rotary shaft and turning therewith,
   at least one first friction member and one second friction member arranged on either side of said at least one rotary braking member, each friction member being moveable between two extreme positions, a first "braking" position when the first friction member and the second friction member are in contact with the rotary braking member and a second "idle" position when they are moved away from the rotary braking member,
   a bracket for holding the first friction member and the second friction member on either side of the rotary braking member,
   means for guiding the movement of the first friction member and of the second friction member on the bracket,
   means for controlling the movement of the first friction member and of the second friction member between the extreme braking and idle positions thereof, including an actuator linked to a transmission system for controlling the first friction member and the second friction member,
   in which said actuator is a linear actuator acting on at least a first lever incorporated in series into said transmission system for controlling said at least first and second friction members, and
   in which the means for controlling the movement of the first friction member and of the second friction member between the extreme braking and idle positions thereof includes, incorporated in series into said control transmission system, an elastically deformable solid element that is able to accumulate potential mechanical energy in the control transmission system, the actuator being able to move, firstly, beyond a first control position of the actuator in which the first friction member and the second friction member reach the braking position thereof and, secondly, beyond a second control position of the actuator in which the first friction member and the second friction member reach the idle position thereof, causing elastic deformation of said deformable solid element under the effect of the linear actuator.

2. Brake system according to claim 1, in which said elastically deformable solid element, which can accumulate potential mechanical energy in said control transmission system, comprises a bendingly deformable part of said first lever under the effect of said linear actuator beyond said extreme positions of the first friction member and of the second friction member.

3. Brake system according to claim 2, also including means for measuring the force applied by the linear actuator to the first friction member and to the second friction member, as well as means for measuring the bow of said bendingly deformable part of said first lever, or means for measuring the stresses applied to this latter.

4. Brake system according to claim 2, characterized in that said means for guiding the movement of the first friction member and of the second friction member on the bracket include at least a first deformable parallelogram and a second deformable parallelogram, respectively, in which said first lever is connected in said control transmission system between a first extremity of the linear actuator and one of the sides of one of the deformable parallelograms, and in which said one of the sides of one of the deformable parallelograms is controlled by the linear actuator.

5. Brake system according to claim 4, characterized in that said first lever is integral with one of the sides of one of the deformable parallelograms, and is arranged as a longitudinal extension thereof.

6. Brake system according to claim 4, in which a second extremity of the linear actuator, opposite the first extremity of said actuator, is connected to one of the sides of the other of said deformable parallelograms.

7. Brake system according to claim 6, in which said second extremity of said linear actuator is cantilevered to one of the sides of the other deformable parallelogram.

8. Brake system according to claim 4 taken together, including means for monitoring the wear of the first friction member and of the second friction member by measuring the distance between the first extremity and the second extremity of the linear actuator.

9. Brake system according to claim 8, in which said linear actuator is a revolving-nut actuator, and in which said means for monitoring the wear of the first friction member and of the second friction member include means for counting the number of revolutions of said revolving nut or of the motor.

10. Rotary-shaft brake system including:
   at least one rotary braking member attached to said rotary shaft and turning therewith,
   at least one first friction member and one second friction member arranged on either side of said at least one rotary braking member, each friction member being moveable between two extreme positions, a first "braking" position when the first friction member and the second friction member are in contact with the rotary braking member and a second "idle" position when they are moved away from the rotary braking member,
   a bracket for holding the first friction member and the second friction member on either side of the rotary braking member,
   means for guiding the movement of the first friction member and of the second friction member on the bracket,
   means for controlling the movement of the first friction member and of the second friction member between the extreme braking and idle positions thereof, including an actuator linked to a transmission system for controlling the first friction member and the second friction member,
   safety means for locking said at least first and second friction members in the second idle position thereof when they are moved away from the rotary braking member, by means of an obstacle-connection member in addition to said means for controlling the movement of said first and second friction members between the extreme braking and idle positions thereof, and
   in which said actuator is a linear actuator acting on at least a first lever incorporated in series into said transmission chain for controlling said at least first and second friction members.

11. Brake system according to claim 10, in which said means for guiding the movement of the first friction member and of the second friction member on the bracket include at least a first deformable parallelogram and a second deformable parallelogram, respectively.

12. Brake system according to claim 11, in which said obstacle-connection member includes a slide system to immobilize said first and second parallelograms, and means for locking the slide system activated by elastic return means to lock said slide system, and that is released by an express command.

13. Brake system according to claim 4, in which said first lever is connected in said control transmission system between a first extremity of the linear actuator and one of the sides of one of the deformable parallelograms, and in which said one of the sides of one of the deformable parallelograms is controlled by the linear actuator.

* * * * *